United States Patent
Halabi et al.

(10) Patent No.: US 7,978,607 B1
(45) Date of Patent: Jul. 12, 2011

(54) SOURCE-BASED CONGESTION DETECTION AND CONTROL

(75) Inventors: Mitri Halabi, San Jose, CA (US); Yuen Fai Wong, San Jose, CA (US); Robert Colvin, San Jose, CA (US); Frank S. Yang, Cupertino, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 140 days.

(21) Appl. No.: 12/412,290

(22) Filed: Mar. 26, 2009

Related U.S. Application Data

(60) Provisional application No. 61/093,196, filed on Aug. 29, 2008.

(51) Int. Cl.
*H04J 1/16* (2006.01)
(52) U.S. Cl. ...... 370/235; 370/229; 370/230; 370/230.1; 370/231; 370/236; 370/414; 370/418
(58) Field of Classification Search .................. 370/229, 370/230, 235, 236, 414, 418, 230.1, 231
See application file for complete search history.

(56) References Cited

U.S. PATENT DOCUMENTS

| | | | | |
|---|---|---|---|---|
| 6,829,217 B1* | 12/2004 | Bechtolsheim et al. | ...... | 370/229 |
| 2004/0032827 A1* | 2/2004 | Hill et al. | ...... | 370/229 |
| 2007/0268830 A1* | 11/2007 | Li et al. | ...... | 370/235 |

OTHER PUBLICATIONS

"Cisco Dynamic Flow Control Solution," White Paper, 2006, 8 pages, Cisco.

\* cited by examiner

*Primary Examiner* — Hassan Kizou
*Assistant Examiner* — Siming Liu
(74) *Attorney, Agent, or Firm* — Kilpatrick Townsend & Stockton LLP

(57) ABSTRACT

Congestion control techniques based upon resource utilization information stored by a network device. According to an embodiment of the present invention, a network device is configured to identify a data source causing congestion based upon information stored by the network device identifying a set of data sources, and for each data source, information identifying the amount of a resource of the network device being used for processing data received by the network device from the data source.

19 Claims, 6 Drawing Sheets

SOURCE-BASED CONGESTION DETECTION AND CONTROL

CROSS-REFERENCES TO RELATED APPLICATIONS

The present application claims the benefit and priority under 35 U.S.C. 119(e) from U.S. Provisional Application No. 61/093,196 filed Aug. 29, 2008 entitled DATA CENTER INPUT FLOW BASED FLOW CONTROL, the entire contents of which are incorporated herein by reference for all purposes.

BACKGROUND OF THE INVENTION

Embodiments of the present invention relate to congestion control, and more particularly to techniques for controlling congestion in a network device based upon information stored by the network device for one or more data sources.

The trend towards higher bandwidth and lower latency data transmissions has necessitated low latency switching architectures that utilize fast cut-through data forwarding techniques and have very low storage memory. There is also a convergence trend to using Ethernet which has placed additional requirements on the network devices responsible for data forwarding (e.g., switches, routers) in terms of flow control and lossless operation. For example, porting Fiber Channel transmissions over to Ethernet requires lossless data transmissions while using forwarding devices with reduced memory resources.

Lossless or even reduced-loss data transmissions depend upon efficient congestion control techniques in network devices. Several congestion control solutions are presently being debated in networking forums, with regards to congestion control in order to enforce, for example, lossless behavior of the Ethernet network. Examples include Backward Congestion Notification (BCN) and Quantized Congestion Notification (QCN). Conventional solutions rely on detecting a congestion point in the network and performing congestion control based upon doing a "sampling" of the packets queued in a switching device where the congestion is experienced. As a result of the sampling, a "guess" is made as to which sender of data or data source is causing the congestion—this is done regardless of whether the data source is the actual culprit or not. A congestion control procedure is then initiated for the randomly selected data source(s). While conventional congestion control procedures differ on the timing algorithm of the flow or congestion control procedures, they all however share the fact of guessing which data source is causing the congestion.

In general, upon detecting congestion in a network device, all of the conventional flow or congestion control approaches use statistical sampling of the received packets to send flow or congestion control messages. Since the identification of the data sources is based upon sampling and not on actual usage, conventional techniques can potentially take longer to converge and can actually slow compliant traffic while leaving non-compliant traffic untouched.

BRIEF SUMMARY OF THE INVENTION

Embodiments of the present invention provide congestion control techniques based upon resource utilization information stored by a network device. According to an embodiment of the present invention, a network device is configured to identify a data source causing congestion based upon information stored by the network device identifying a set of data sources, and for each data source, information identifying the amount of a resource of the network device being used for processing data received by the network device from the data source.

In one embodiment, a network device stores resource utilization information identifying one or more data sources, and for each data source, one or more resource utilization values associated with the data source, each resource utilization value tracking an amount of a resource (e.g., memory) of the network device being used for processing data originating at the data source and received by the network device. Upon identifying a data source as the cause of congestion based upon the resource utilization information, the network device may initiate one or more congestion control actions directed to that data source. In this manner, congestion control actions are directed to the data source that is actually the cause of the congestion.

According to an embodiment of the present invention, techniques are provided for controlling congestion in a network device. A network device may store resource utilization information, the resource utilization information identifying a set of data sources, and for each data source in the set of data sources, one or more resource utilization values, each resource utilization value indicating an amount of a resource of the network device being used for processing data originating from the data source. The network device may identify, based upon the resource utilization information, if a congestion control action is to be initiated for a data source from the set of data sources. The identifying performed by the network device may comprise comparing a resource utilization value associated with the data source with a threshold configured for the network device, and determining if the congestion control action is to be initiated for the data source based upon the comparison. Examples of resources may include but are not limited to memory, processor utilization, buffer blocks, bandwidth, pointers, and the like.

In one embodiment, the comparing may comprise determining if the resource utilization value equals or exceeds the threshold or is less than the threshold.

In one embodiment, the network device may initiate the congestion control action by sending a message to the data source to pause or slow down transmission of data from the data source.

According to another embodiment of the present invention, techniques are provided for controlling congestion in a network device or system by detecting occurrence of an event impacting a resource of the network device, determining a data source corresponding to the event, updating a resource utilization value associated with the data source based upon the detected event, the resource utilization value tracking an amount of the resource of the network device being used to process data originating at the data source, comparing the updated resource utilization value associated with data source to a first threshold, and determining if a congestion control action is to be initiated for the data source based upon the comparison.

In one embodiment, the network device may be configured to compare the updated resource utilization value associated with the data source to a second threshold, send a first message to the data source to either pause, slow down, or resume transmission of a first type of data based upon the comparison of the updated resource utilization value with the first threshold, and send a second message to the data source to either pause, slow down, or resume transmission of a second type of data based upon the comparison of the updated resource utilization value with the second threshold, the second type of data being different from the first type of data. In one embodiment, the first type of data may correspond to data associated with a first priority and the second type of data may correspond to data associated with a second priority different from the first priority.

In one embodiment, the network device is configured to determine the data source by determining a data packet involved in the detected event, and determining a data source where the data packet originated. In one embodiment, the data source where the data packet originated may be determined by extracting information from the data packet, and determining the data source based upon the extracted information. For example, an MPLS tag in the packet may be used to determine the originating data source.

In one embodiment, the detected event may correspond to receipt of a data packet by the network device and the network device may determine a data source corresponding to the event by determining a data source where the data packet originated. The network device may update the resource utilization value by determining an amount of memory needed for storing the data packet, and incrementing the resource utilization value by the determined amount of memory. In one embodiment, a tag may be associated with the data packet, the tag comprising information usable for determining the data source for the data packet. The tag may be used internally by the network device to track resource utilization for the packet within the network device. The tag is removed before the packet is forwarded from the network device.

In one embodiment, the event may correspond to de-buffering of a data packet by the network device. The network device may determine a data source corresponding to the event by determining a data source where the data packet originated. The network device may update the resource utilization value by determining an amount of memory freed by de-buffering of the data packet, and decrementing the resource utilization value by the determined amount of freed memory.

The network device or system may also be configured to initiate a congestion control action upon determining, based upon the comparison, that the resource utilization value equals or exceeds the first threshold, wherein the initiated congestion control action comprises sending a message to the data source to pause or slow down transmission of data from the data source.

The network device or system may also be configured to initiate a congestion control action upon determining that the resource utilization value is below the first threshold, wherein the congestion control action comprises sending a message to the data source to resume transmission of data.

The foregoing, together with other features and embodiments will become more apparent when referring to the following specification, claims, and accompanying drawings.

DETAILED DESCRIPTION OF THE INVENTION

In the following description, for the purposes of explanation, specific details are set forth in order to provide a thorough understanding of embodiments of the invention.

However, it will be apparent that the invention may be practiced without these specific details.

Embodiments of the present invention provide congestion control techniques based upon resource utilization information stored by a network device. According to an embodiment of the present invention, a network device is configured to identify a data source causing congestion based upon information stored by the network device identifying a set of data sources, and for each data source, information identifying the amount or level of a resource of the network device being used for processing data received by the network device from the data source. Examples of resources of the network device that may be tracked using embodiments of the present invention include, but are not limited to, memory in the network device, buffer blocks in the network device used for buffering data received by the network device, utilization of a processor in the network device, reference pointers (e.g., data pointers) used by the network device, bandwidth (e.g., physical or use configured bandwidth), and the like.

Figure 1:
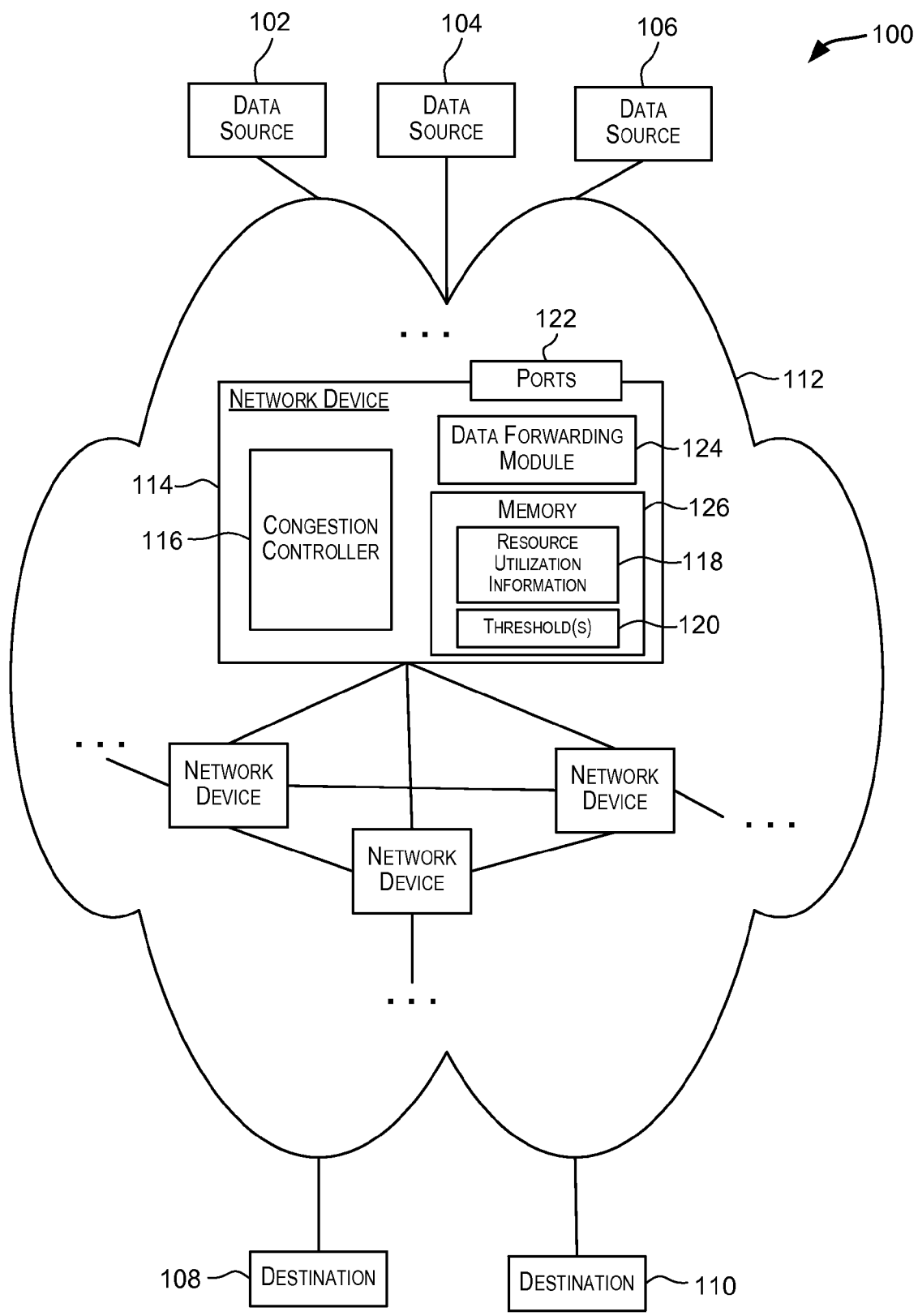
FIG. 1 depicts a simplified block diagram of a network system incorporating an embodiment of the present invention.

FIG. 1 depicts a simplified block diagram of a network system 100 incorporating an embodiment of the present invention. Network system 100 comprises a number of devices including one or more data sources 102, 104, 106 coupled to one or more destination devices 108, 110 via a communication network 112. For purposes of this application, a data source represents an origination point for data, i.e., a device where the data originates. A device which merely receives data and forwards that data but is not the origination point of the data is not a data source for that data for purposes of this application. Examples of a data source include a system acting as a server, a virtual machine or virtualized server, a source of data packets, and the like. The data originating at a data source may be destined for one or more destination devices. While FIG. 1 depicts two destinations 108 and 110, it should be understood that there may be multiple destinations for the data. Further, a system may serve as both a data source and as a destination device.

Communication network 112 is configured to facilitate communication of data from a data source to one or more destination devices. Communication network 112 may be of different types including a local area network (LAN), a wide area network (WAN), the Internet, etc. Communication network 112 may use various different protocols to communicate data including but not restricted to TCP/IP, wireless protocols, Fiber Channel, Ethernet (e.g., IEEE 802.3 and its variants), and the like. Wired or wireless links may be used for the forwarding the data from a data source to a destination.

Communication network 112 may comprise one or more network devices that are configured to forward data such that the data is communicated from a data source to one or more destination devices. A network device may comprise one or more ports for receiving and forwarding data to facilitate communication of the data from a data source to one or more destination devices. For example, a network device may receive data from a device (which may be a data source device or other network device) and forward the received data to another device (which may be a destination device for the forwarded data or some other network device). As a result of such forwarding, data is communicated from a data source where the data originates to a destination device which is the intended destination for the data. Examples of network devices include routers, switches, etc., including network devices provided by Brocade Communications Systems, Inc™.

In one embodiment, a network device itself may be a data source or a destination device. For example, a network device itself may be the originating source of a data stream or the destination for the data. Further, data source devices (e.g., 102, 104, 106) and/or destination devices (e.g., 108, 110) may also function as data forwarding devices for forwarding data from a data source to a destination device.

As previously indicated, a network device may comprise one or more ports for receiving and forwarding data. A network device is typically configured to store the received data in buffers provided by the network device, perform processing to determine how the data is to be forwarded, and then forward the data from the network device per the determination. For example, data packets received by a network device may be buffered in one or more queues stored in a memory of the network device awaiting processing and transmission from the network device. The queued data packets are then processed by the network device to determine how the packets are to be forwarded. The packets are then de-queued and forwarded from the network device via one or more ports of the network device.

The processing performed by a network device uses memory, processing, and other resources of the network device. As a network device receives data packets, the received packets contend for resources of the network device such as buffer space, link bandwidth, etc. Congestion may develop in the network device from too many packets contending for limited resources of the network device, e.g., link bandwidth and buffer space resources. The congestion may even force the network device to discard packets.

A network device uses congestion control techniques to avoid or reduce the congestion that may develop in the network device. According to an embodiment of the present invention, a network device uses congestion control techniques that use resource utilization information stored by a network device. In one embodiment, resource utilization information stored by a network device identifies one or more data sources from whom the network device has received data, and for each data source, one or more resource utilization values, each resource utilization value corresponding to a resource (e.g., memory) of the network device and indicating the amount of the resource in network device being used for processing data originating from the data source. The resource utilization information is thus used by the network device to identify one or more data sources causing congestion in the network device. The network device may then initiate actions directed to the identified data source to minimize the congestion. In this manner, instead of using sampling to guess a source of congestion as in conventional techniques, embodiments of the present invention use actual resource utilization information corresponding to the data sources to identify one or more data sources causing congestion in the network device.

An embodiment of the present invention is described below with respect to network device 114 depicted in FIG. 1. Network device 114 may be one or several hops away from a data source and/or from a destination device. It should however be apparent that other network devices may also be configured to perform processing in a manner similar to the processing described for network device 114.

As depicted in FIG. 1, network device 114 comprises one or more physical ports 122, a data forwarding module (or processor) 124, a congestion controller 116, and memory 126. Ports 122 are used for receiving data and for transmitting data from network device 114. Data forwarding module 124 is configured to perform processing to facilitate the forwarding of data packets received by network device 114. As part of the processing, data forwarding module 124 may be configured to process a data packet received via an input port to determine an output port of network device 114 via which the packet is to be forwarded from network device 114. Data forwarding module 124 may perform processing to forward the data packet from the input port to the output port for eventual forwarding of the data packet from network device 114 using the output port. Data forwarding module 124 may comprise hardware, software components, or combinations thereof. The hardware components may include ASICs, field programmable logic devices such as FPGAs, circuitry, and the like. The software components may include programs comprising code or instructions that are executed by a processor within data forwarding module 124.

According to an embodiment of the present invention, congestion controller 116 is configured to perform congestion-related processing. In one embodiment, congestion controller 116 is configured to keep resource utilization information 118 updated for a network device, detect presence of congestion in the network device, identify a data source causing the congestion, and initiate one or more congestion control actions upon detection of congestion. Congestion controller 116 may be implemented in software (e.g., code, program, instructions) executed by a processor network device 114, in hardware (e.g., using a programmable device such as FPGA, or an ASIC), or combinations thereof. The software components may be stored in memory 126.

The data used by congestion controller 116 to perform congestion-related processing may be stored in memory 126. Memory 126 may include volatile memory and/or non-volatile memory. As depicted in FIG. 1, memory 126 stores resource utilization information 118 and thresholds information 120.

In one embodiment, resource utilization information 118 comprises information identifying one or more data sources from whom network device 114 has received data, and for each data source, one or more resource utilization values, each resource utilization value corresponding to a resource (e.g., memory) of the network device and indicating the amount or level of the resource in network device being used for processing data originating from the data source and received by network device 114. Resource utilization information 118 may be stored in various formats. In one embodiment, resource utilization information 118 is stored in the form of one or more tables with each row of a table identifying a data source and one or more resource utilization values corresponding to data source, each resource utilization value identifying the amount or count of a resource of network device 114 being used for processing data that originates at the data source.

In one embodiment, only one resource utilization value may be stored for a data source tracking usage of a single resource. In such an embodiment, the number of rows in the table may represent the number of different data sources whose data is received by network device 114. In alternative embodiments, multiple resource utilization values for each data source, each resource utilization value corresponding to a particular resource of network device 114 being tracked for the data source.

Resource utilization information 116 may also be combined with other information stored by network device 114. For example, a network device 114 typically stores a forwarding table (e.g., a routing table) that is used by the network device to make decisions related to how data received by the network device is to be forwarded. In one embodiment, the forwarding table stored by network device 114 may be augmented with the resource utilization information for the data sources.

Congestion controller 118 in network device 114 is configured to keep the resource utilization information stored by the network device up to date. As part of this processing, for data received and being processed by network device 114, congestion controller 116 is configured to determine the data source(s) of the received data and update, for each data source, the one or more resource utilization values stored by the network device for the data source such that each resource utilization value indicates the amount of a resource of network device 114 being used for processing data originating from the data source. For example, if the resource being tracked is memory, congestion controller 116 is configured to update a resource utilization value for a data source that tracks the amount of memory (e.g., buffer space) of network device 114 being used to process data originating from that data source.

Various techniques may be used to determine a data source for data received by network device 114. In one embodiment, for a data packet received by network device 114, congestion controller 116 is configured to extract the MAC address from the data packet and then determine the data source for the received data packet based upon the extracted MAC address. In another embodiment, congestion controller 116 may use other parts of a received data packet to determine the data source for the data packet. For example, in one embodiment, one or more portions of a data packet header may be used to determine a data source for the data packet. In another embodiment, a lookup target may be prepared based upon information extracted from a received data packet. The lookup target may then be used to determine the data source for the packet. For example, the lookup target may be used to perform a lookup in a CAM in network device 114. The data source for a packet may be determined based upon the results of the CAM lookup. For example, a matching CAM entry may point to a memory location in network device 114 that stores information identifying the data source where the data packet originated. The determined data source may then be added to resource utilization information 118, if not already included, and one or more resource utilization values associated with the data source may be updated.

Congestion controller 116 is configured to update the one or more resource utilization values associated with a data source such that each resource utilization value reflects an accurate count or amount of a resource of network device 114 tracked by the resource utilization value that is being used for processing data packets received from the data source. In one embodiment, updates to a resource utilization value tracking usage of a resource of network device 114 may be performed in response to occurrences of certain events in network device 114 that impact utilization of that resource. For example, if the resource being tracked is memory of network device 114, events that may cause the resource utilization information 118 to be checked and updated include events such as (1) network device 114 receives a data packet and queues it in a buffer queue; (2) a packet is de-queued from a queue of network device 114 and transmitted from network device 114; (3) others that impact memory usage within network device 114. The events that trigger a check and possible update of resource utilization information 118 may be user-configurable.

As previously indicated, congestion controller 116 is configured to detect occurrences of congestion in network device 114 and take one or more congestion control measure to alleviate the congestion. There are different ways in which presence of congestion may be detected in network device 114. In one embodiment, congestion controller 116 is configured to detect occurrences of congestion in network device 114 based upon resource utilization information 118. In one embodiment, one or more thresholds 120 may be configured for network device 114 to identify congestion situations. For example, for a particular resource being tracked, a threshold for that particular resource may be configured for network device 114 such that a congestion condition is indicated when a resource utilization value tracking usage of the particular resource for a data source equals or exceeds the preconfigured threshold. One or more congestion control actions directed towards the particular data source causing the congestion condition may then be initiated by network device 114.

In one embodiment, for each data source identified in resource utilization information 118, congestion controller 116 may be configured to compare a resource utilization value associated with the data source to the preconfigured threshold. Based upon the comparison, congestion controller 116 may determine if a congestion condition exists. One or more congestion control actions may then be initiated by congestion controller 116 directed towards each data source identified as causing the congestion. In this manner, a data source is identified as the cause of the congestion based upon resource usage information stored for the data source by network device 114 and appropriate congestion control actions initiated directed to the offending data source. Accordingly, congestion controller 116 is configured to identify data sources that are causes of congestion and initiate congestion control actions based upon information stored by resource utilization information 118. For example, a congestion control action for a particular data source may be initiated when the resource utilization value associated with the particular data source, which represents the amount of the resource of network device 114 being used for processing data originating from the data source, reaches or exceeds a preconfigured threshold 120.

For example, a network device may store resource utilization values to track the amount of memory of the network device being used for processing data packets received from one or more data sources. A threshold value of 10 KB may be configured for the network device such that a congestion condition is indicated if a resource utilization value for a data source exceeds the threshold value of 10 KB. One or more congestion control actions may be directed towards a particular data source upon determining that the resource utilization value for that data source exceeds 10 KB.

Various different congestion control actions may be initiated by network device 114. In one embodiment, the actions involve sending congestion control messages to the data source responsible for the congestion. Congestion control messages may be sent according to various congestion control protocols such as 802.1Qau, QCN, BCN, 802.1Qbb, 802.3x (e.g., flow control messages such as PAUSE messages), and the like.

In one embodiment, a congestion control message may be sent to the offending data source that causes the data source to pause or slow down sending of data. For example, when a resource utilization value associated with a data source reaches or exceeds a threshold configured for the network device, a PAUSE message (according to 802.3x) may be sent by the network device to the offending data source. The PAUSE message is a control flow mechanism that causes the data source to halt transmission of data for a specified period of time. The time period for which the data transmission is paused may be specified in the PAUSE message itself. Normal data transmission resumes once the time period expires, unless another congestion control message is received within the time period.

As another example, a congestion control message may be sent to the offending data source that causes the data source to slow down transmission of data from the data source. For example, QCN and BCN control messages may be sent to a data source causing the data source to slow down transmission of data. The slow down typically follows a time curve and normal transmission is resumed after the time curve has passed, unless another congestion control message is received within the time period.

The main goal behind sending the congestion control messages to the offending data source is to reduce the amount of data (e.g., number of data packets) originating from the data source and received by network device 114. This in turn may reduce the amount of the resource of network device 114 being used for processing data received from the offending data source and thereby alleviate the congestion condition in network device 114.

The above examples describe congestion control messages that are sent by a network device to pause or slow down transmission of data from a data source when that data source is identified as the cause of a congestion condition in the network device. Congestion control messages may also be sent by the network device to a data source to resume normal transmission of data. For example, for a data source whose data transmission has been previously paused or slowed down, and if subsequently, it is determined that the resource utilization value associated with the data source is now below the threshold configured for the network device (i.e., the congestion condition caused by the data source no longer exists), a congestion control message may be sent by the network device to the data source to resume normal transmission of data.

In this manner, appropriate congestion control actions are initiated by network device 114 based upon comparison of resource utilization value data to a threshold configured for network device 114. If the comparison indicates a congestion condition, then one or more congestion control messages may be sent to the offending data source by network device 114 to pause or slow down transmission of data. The time period for which the data source pauses or slows down data transmission is dependent upon the congestion control protocol being used and in some protocols may be specified in the congestion control message. Normal data transmission, i.e., data transmission without any pause or controlled slow down, is resumed after the time period has passed, unless another congestion control message to pause or slow down transmission is received within the time period. If the comparison indicates that a previously detected congestion condition no longer exists, then one or more congestion control messages may be sent to the previously offending data source by network device 114 to resume normal transmission of data. It should be apparent that congestion control messages for resumption of normal data transmission are not required, since the stoppage or slow down of data transmission lasts only for a preconfigured period of time and normal data transmission is resumed after the time period has passed, unless another congestion control message to pause or slow down transmission is received within the time period.

Network device 114 may be configured to send a congestion control message (to stop or slow down data transmission) to the offending data source when it is determined that a resource utilization value associated with the data source, and which tracks usage of a particular resource of network device 114, equals or exceeds a threshold configured for the network device. Subsequently, congestion controller 116 may be configured to periodically, at a preconfigured time interval, check if the resource utilization associated with the offending data source value is equal to or greater than the threshold. For each check, if the resource utilization value is determined to be still equal to or greater than the threshold, another congestion control message to pause or slow down data transmission is sent to the offending data source. In one embodiment, after a congestion condition has been detected, network device 114 is configured to check if the congestion persists (i.e., compare the resource utilization value to the threshold value) periodically such that a congestion control message to pause or slow down data transmission is sent to the offending data source before resumption of normal data transmission from the data source. The checks may be performed until it is determined that the utilization resource value associated with the offending data source is below the threshold. In this manner, congestion control messages are sent from network device 114 to the offending data source periodically until the resource utilization value associated with the data source falls below the threshold thereby indicating that the congestion condition caused by the offending data source no longer exists.

Network device 114 may also be configured to send a congestion control message to a previously offending data source to request resumption of normal data transmission upon determining that the resource utilization value associated with the offending data source has fallen below the threshold thereby indicating that the congestion condition caused by the offending data source no longer exists.

As described above, resource utilization information 118 comprises information identifying one or more data sources, and for each data source, one or more resource utilization values, each resource utilization value tracking an amount or level of a resource of network device 114 being used for processing data originating from the data source. Accordingly, usages of multiple resources of network device 114 may be tracked by resource utilization information 118. In one embodiment, a threshold value may be configured for network device 114 for each resource of network device 114 that is tracked. A threshold for one resource may be the same as or different from the threshold value for another resource. The congestion controls actions that are performed upon reaching or exceeding a threshold related to one resource may be the same as or different from the actions performed upon reaching or exceeding a threshold related to another resource of network device 114.

In one embodiment, different thresholds may be configured for the same resource. The congestion controls actions that are performed upon reaching or exceeding one threshold for the resource may be the same as or different from the actions performed upon reaching or exceeding another threshold configured for the same resource of network device 114.

In one embodiment, multiple thresholds may be configured for a particular resource (e.g., memory) of network device 114 for different types of data received by network device 114. The type of data may for example correspond to the priority associated with the data. In such an embodiment, different thresholds may be configured for different priority levels. For example, if the resource being tracked is memory of network device 114, a first memory threshold may be configured for data of a first priority (e.g., data with priority 0), a second memory threshold may be configured for data of a second priority (e.g., data with priority 1), a third memory threshold may be configured for data of a third priority (e.g., data with priority 2), and so on. In one embodiment, the threshold values for the data types may be scaled such that the first threshold value is less than the second threshold value, the second threshold value is less than the third threshold value, and so on. However, such scaling is not needed in other embodiments. The threshold configured for one data type may be the same as or different from a threshold configured for another data type.

For example, a data source may be capable of originating data packets associated with different priorities. As part of determining whether a congestion control action is to be performed for the data source, congestion controller 116 may be configured to compare the resource utilization value associated with the data source and which tracks usage of a particular resource to the multiple preconfigured thresholds configured for network device 114 for that resource. Based upon the comparisons, congestion controller 116 may initiate one or more congestion control actions directed to that data source. The actions may be different for the different thresholds. For example, four different priorities P0, P1, P2, and P3 of packets may be received by a network device, with P0 being the lowest priority, P1 being a higher priority than P0, P2 being a higher priority than P1, and P3 being the highest priority. In a network device, a threshold may be configured for each priority. For example, a threshold T0 may be configured for P0, a threshold T1 may be configured for P1, a threshold T2 may be configured for P2, and a threshold T3 may be configured for P3. In such a system, if the resource utilization value for a data source equals or exceeds the threshold T0 corresponding to priority P0, then a congestion control message may be sent by network device 114 to the data source requesting the data source to pause or slow down sending data corresponding to priority P0; if the resource utilization value equals or exceeds the threshold T1 corresponding to priority P1, then a congestion control message may be sent by network device 114 to the data source requesting the data source to pause or slow down sending data corresponding to priorities P0 and P1; if the resource utilization value equals or exceeds the threshold T2 corresponding to priority P2, then a congestion control message may be sent by network device 114 to the data source requesting the data source to pause or slow down sending data corresponding to priorities P0, P1, and P2; if the resource utilization value equals or exceeds the threshold T3 corresponding to priority P3, then a congestion control message may be sent by network device 114 to the data source requesting the data source to pause or slow down sending data corresponding to priorities P0, P1, P2, and P3. The congestion control messages may be periodically sent, as previously described.

Processing to determine whether a congestion control action is to be performed may be triggered in response to various events in network device 114. In one embodiment, each time that resource utilization information 118 is checked and/or updated, processing may be performed to determine if one or more congestion control actions are to be performed. As previously described, resource utilization information 118 may be updated in response to events such as when network device 114 receives a data packet and queues it in a buffer queue, a packet is de-queued from a queue of network device 114 and transmitted from network device 114, and others that impact usage of resources of network device 114 that are being tracked by resource utilization values associated with data sources. Accordingly, when these events occur, processing is performed to determine if one or more congestion control actions are to be performed for one or more data sources.

Figure 2:
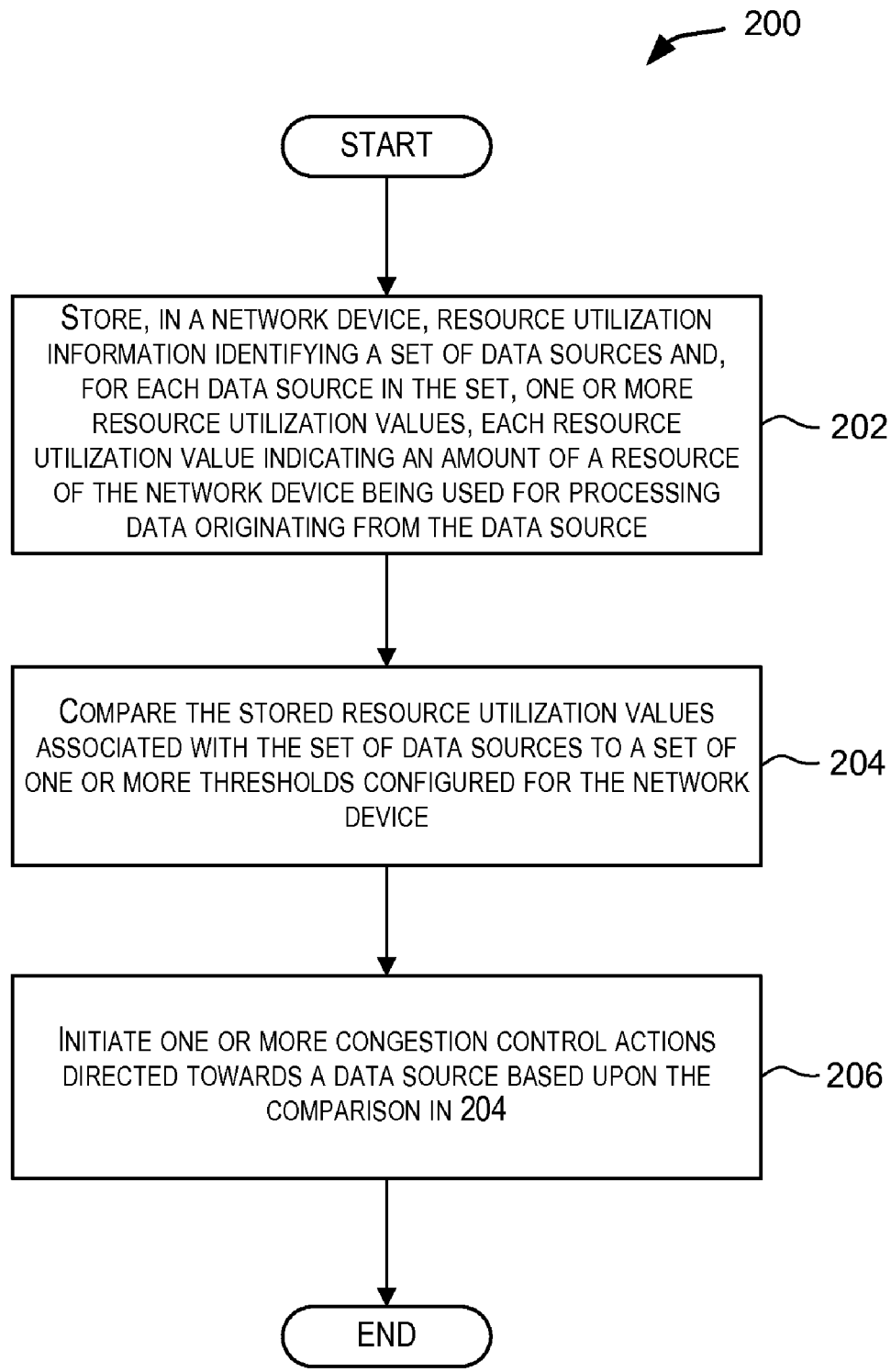
FIG. 2 is a simplified flowchart depicting a method of using resource utilization information to initiate one or more congestion control actions according to an embodiment of the present invention.

FIG. 2 is a simplified flowchart 200 depicting a method of using resource utilization information to initiate one or more congestion control actions according to an embodiment of the present invention. The method depicted in FIG. 2 may be implemented in software (e.g., program, code, instructions executed by a processor of a network device), or hardware, or combinations thereof. The software may be stored on a computer-readable storage medium.

In one embodiment, the method is performed by congestion controller 116 of a network device.

As depicted in FIG. 2, a network device stores resource utilization information, where the resource utilization information identifies a set of one or more data sources and, for each data source in the set, one or more resource utilization values, each resource utilization value indicating an amount of a resource of the network device being used for processing data originating from the data source (step 202). The resource utilization values associated with the set of data sources are then compared to one or more thresholds configured for the network device to determine if any congestion-control actions are to be performed (step 204). The comparison may indicate the presence of congestion (e.g., when a resource utilization value reaches or exceeds a threshold). The comparison may indicate resolution of a previous congestion condition (e.g., when resource utilization value that previously reached or exceeded a threshold now is below the threshold). The data source causing the congestion may also be determined in 204. Based upon the comparisons performed in 204, one or more congestion control actions directed towards a data source may be initiated (step 206). For example, as previously described, messages to pause or slow down transmission of data or messages to resume transmission of data may be sent to the determined data source.

In embodiments where multiple resource utilization values are associated with a data source, each resource utilization value may track the amount of a particular resource of the network device being used for processing data originating from the data source. One or more actions may then be performed based upon the comparisons. The actions that are performed for one resource utilization value may be the same as or different from an action performed for another resource utilization value.

Figure 3:
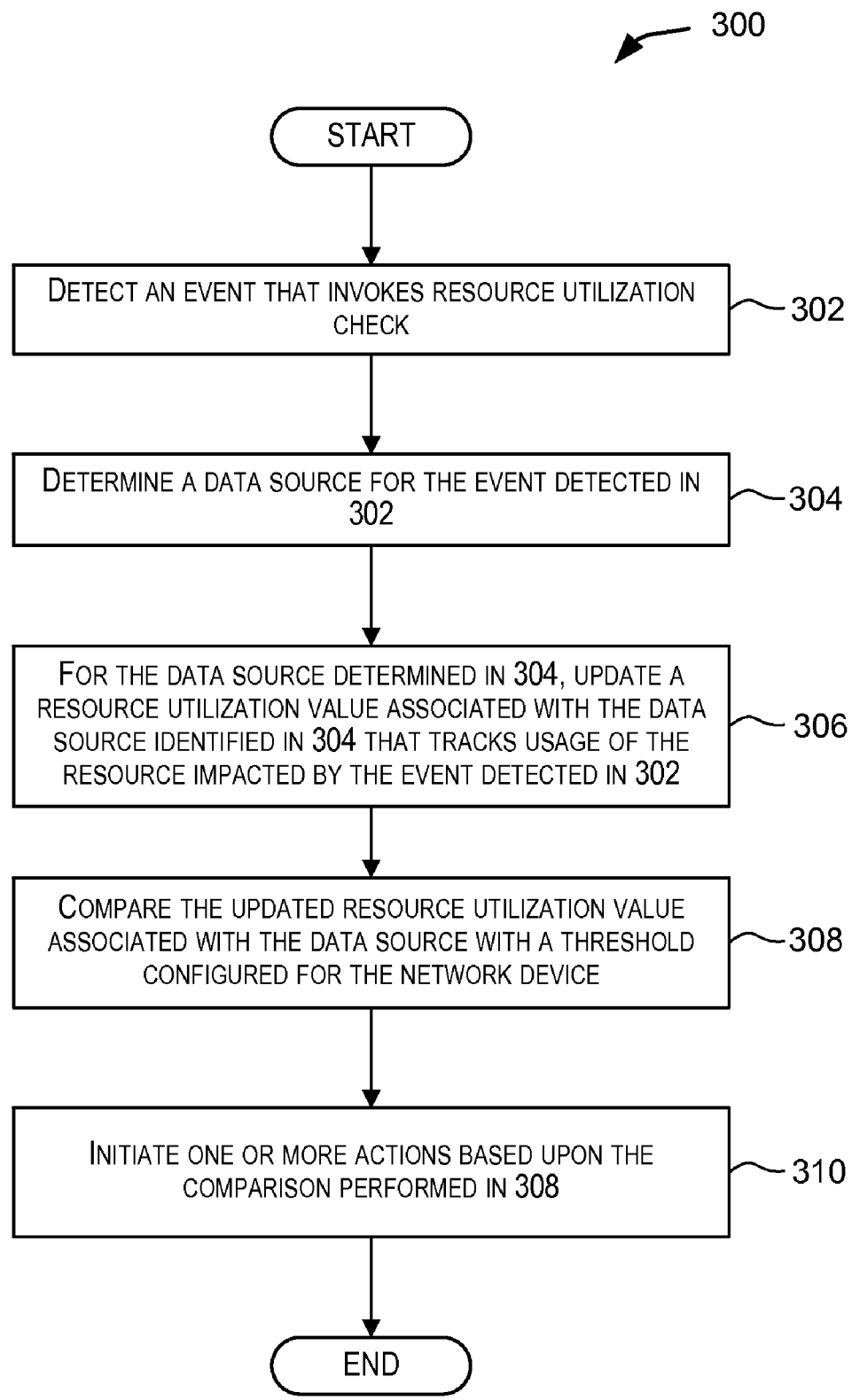
FIG. 3 is a simplified flowchart depicting a method of performing congestion control actions according to an embodiment of the present invention.

FIG. 3 is a simplified flowchart 300 depicting a method of performing congestion control actions according to an embodiment of the present invention. The method depicted in FIG. 3 may be implemented in software (e.g., program, code, instructions executed by a processor of a network device), or hardware, or combinations thereof. In one embodiment, the method is performed by congestion controller 116 of a network device.

As depicted in FIG. 3, an event that impacts usage of a resource in a network device is detected (step 302). The event detected in 302 may be, for example, receiving a data packet and buffering the packet in a queue in the network device, removing a previously buffered packet from a queue of the network device and preparing the data packet for transmission from the network device, and other events that impact resources in a network device.

A data source is then determined for the event detected in 302 (step 304). In one embodiment, the event detected in 302 is attributed to some data being processed by the network device. For example, the event in 302 may be caused by the network device receiving a data packet and the data packet being buffered in a memory of the network device. A data source from where the data packet originated is identified in 304. As previously described various different techniques may be used to determine the originating data source. For example, the MAC address from a received data packet may be used to determine the data source for the received data packet.

For the data source determined in 304, a resource utilization value associated with the data source that tracks usage of the resource impacted by the event detected in 302 is then updated to reflect occurrence of the event (step 306). For example, if the event is receipt and buffering of a data packet in a memory of the network device, the amount of memory used for the buffering is determined and a resource utilization value associated with the data source that tracks memory usage is updated by the determined amount of memory (i.e., the resource utilization value is increased by the amount of memory used for the buffering). As another example, if the event is de-buffering of a data packet from a memory of the network device, the amount of memory freed due to the de-buffering is determined and a resource utilization value associated with the data source that tracks memory usage is decremented by the amount of memory freed due to the de-buffering. In this manner, the resource utilization value associated with the data source is updated so that it continues to track the amount of the resource of the network device being used to process data received from the data source identified in 304.

It should be noted that if the data source determined in 304 is not already included in resource utilization information 118, it indicates that the data source is a new data source. In this scenario, after determining the data source in 304, information may be added to the resource utilization information 118 in 306 identifying the new data source and its associated resource utilization value is appropriately updated.

The updated resource utilization value is then compared to a threshold configured for the network device for the impacted resource (step 308). For example, if the resource is memory, the updated resource utilization value is compared to a memory threshold configured for the network device. In an alternative embodiment, if multiple thresholds have been defined for the same resource, the resource utilization value may be compared to the multiple thresholds configured for the network device.

One or more actions may then be initiated based upon the results of the comparison performed in 308 (step 310). For example, if the updated resource utilization value is compared to a memory threshold configured for the network device in 308 and is determined to be below the threshold, then no action may be performed. Alternatively, if the updated resource utilization value is determined to be below the threshold and it is also determined that transmission of data from the data source has previously been paused or slowed down, then a congestion control message may optionally be transmitted to the data source to resume normal transmission of data. If it is determined from the comparison that the resource utilization value is equal to or exceeds the threshold then one or more actions may be performed such as sending one or more congestion control messages to the data source to pause or slow down data transmission for a period of time. The one or more actions performed in 310 may cause additional actions to be performed such as periodic checks and sending of messages, as previously described.

Figure 4:
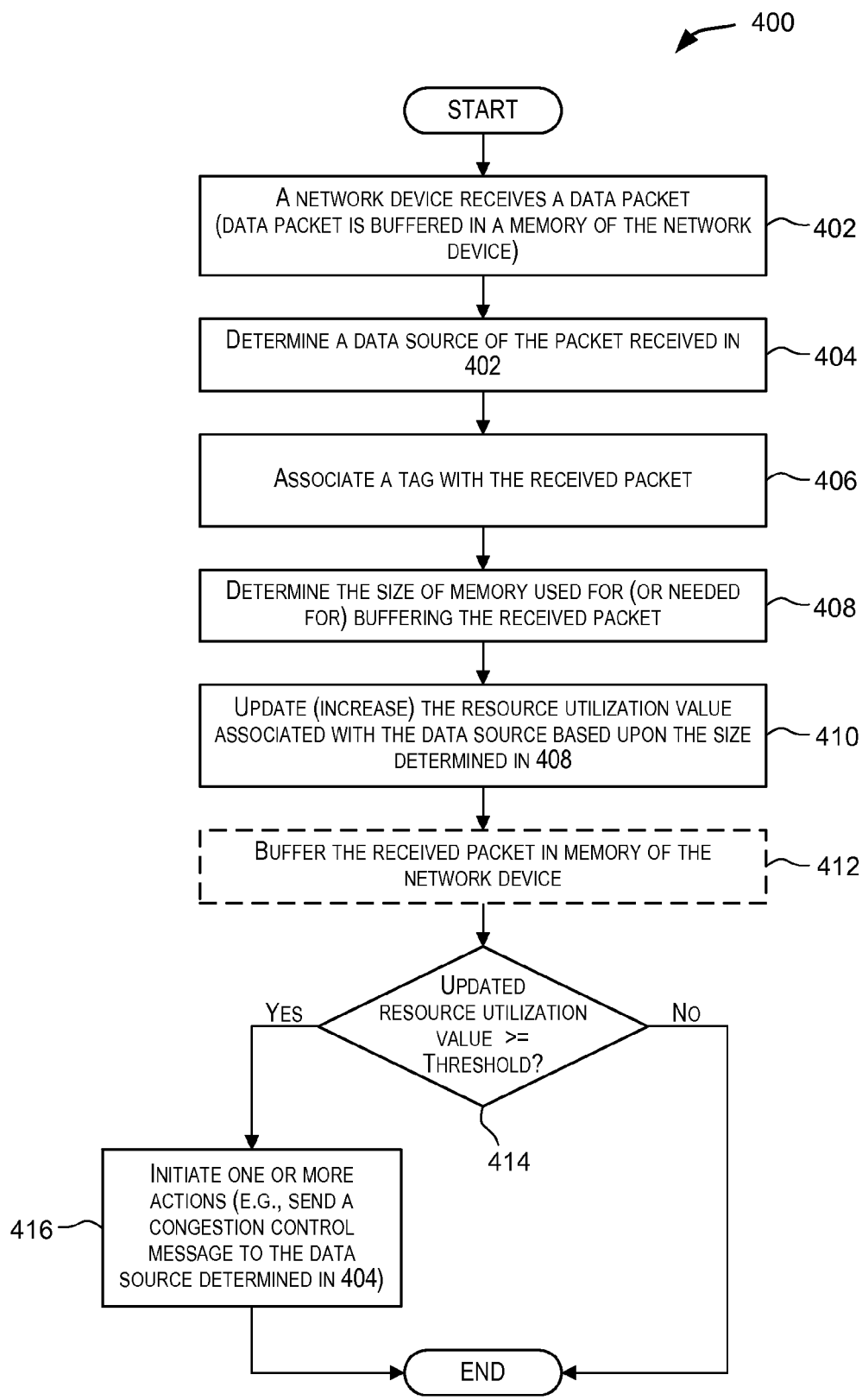
FIG. 4 is a simplified flowchart depicting a method of determining if one or more actions are to be performed upon the receipt and buffering of a data packet by a network device according to an embodiment of the present invention.

FIG. 4 is a simplified flowchart 400 depicting a method of determining if one or more actions are to be performed upon the receipt and buffering of a data packet by a network device according to an embodiment of the present invention. The method depicted in FIG. 4 may be implemented in software (e.g., program, code, instructions executed by a processor of a network device), or hardware, or combinations thereof. In one embodiment, the method is performed by congestion controller 116 of a network device. The embodiment depicted in FIG. 4 assumes that the memory usage is tracked by a resource utilization value associated with a data source.

As depicted in FIG. 4, processing is initiated when a network device receives a data packet (step 402). The received data packet may also be buffered in a memory of the network device, or this may occur later.

A data source is then determined for the data packet received in 402 (step 404). As previously described, various different techniques may be used to determine the origination point of the data packet. For example, in one embodiment, a MAC address extracted from the received data packet may identify the data source.

A tag is then associated with the received data packet (step 406). The tag indicates that resource accounting for the packet is to be performed. The tag is used internally by the network device to track resource utilization for the packet within the network device. The tag is removed before the packet is forwarded from the network device. In one embodiment, information used to determine the data source for the packet in 404, for example, MAC address of the data packet, may be inserted into the tag.

In one embodiment, resource utilization information 118 may be stored in a table with each row of the table identifying a data source. In such an embodiment, when a new data source is recognized (i.e., a data source not included in the table), a new row (table[i]) is inserted into the table for storing information for the data source. Information is stored in table [i] identifying the data source and one or more resource utilization values (in columns of the table[i]) are associated with the data source. The resource utilization values may be initialized to zero. A tag associated with the packet may store information identifying index "i". Index "i" may be used to access the table entry corresponding to the data source to find information identifying the data source (for example, in step 504 of FIG. 5) and associated one or more resource utilization values.

A size of memory of the network device used for or needed for buffering the received data packet is then determined (step 408). In one embodiment, this may be determined based upon the size of the received data packet.

A resource utilization value associated with the data source determined in 404 and that tracks usage of memory in network device 114 is then updated based upon the memory amount determined in 408 (step 410). The resource utilization value may be stored in resource utilization information stored by the network device. The resource utilization value may be incremented by the amount of memory determined in 408. It should be noted that if data source determined in 404 is a newly discovered data source (i.e., not already identified in the resource utilization information), then information may be added to the resource utilization information identifying the data source determined in 404 and its associated resource utilization value may be appropriately updated. The received data packet may then be buffered, if not already buffered in 402 (step 412).

The updated resource utilization value is then compared to a memory-related threshold configured for the network device to see if the updated resource utilization value equals or exceeds a memory-related threshold (step 414). If the threshold is equaled or exceeded, then this may indicate the presence of a congestion condition, and one or more actions directed to the data source determined in 404 may be initiated by the network device (step 416). For example, in one embodiment, one or more congestion control messages (e.g., a PAUSE message) may be sent to the data source to cause the data source to suspend or slow down sending of data for a period of time. No actions may be performed if the updated resource utilization value is determined to be less than the threshold.

As previously described, the resource utilization value may be periodically checked against the threshold and congestion control messages sent after every check as long as the resource utilization value continues to equal or exceed the threshold. Sending of pause messages may be stopped when it is determined that the resource utilization value no longer equals or exceeds the threshold. A message to resume data transmission may also optionally be sent upon determining that the congestion condition caused by the data source no longer exists.

Figure 5:
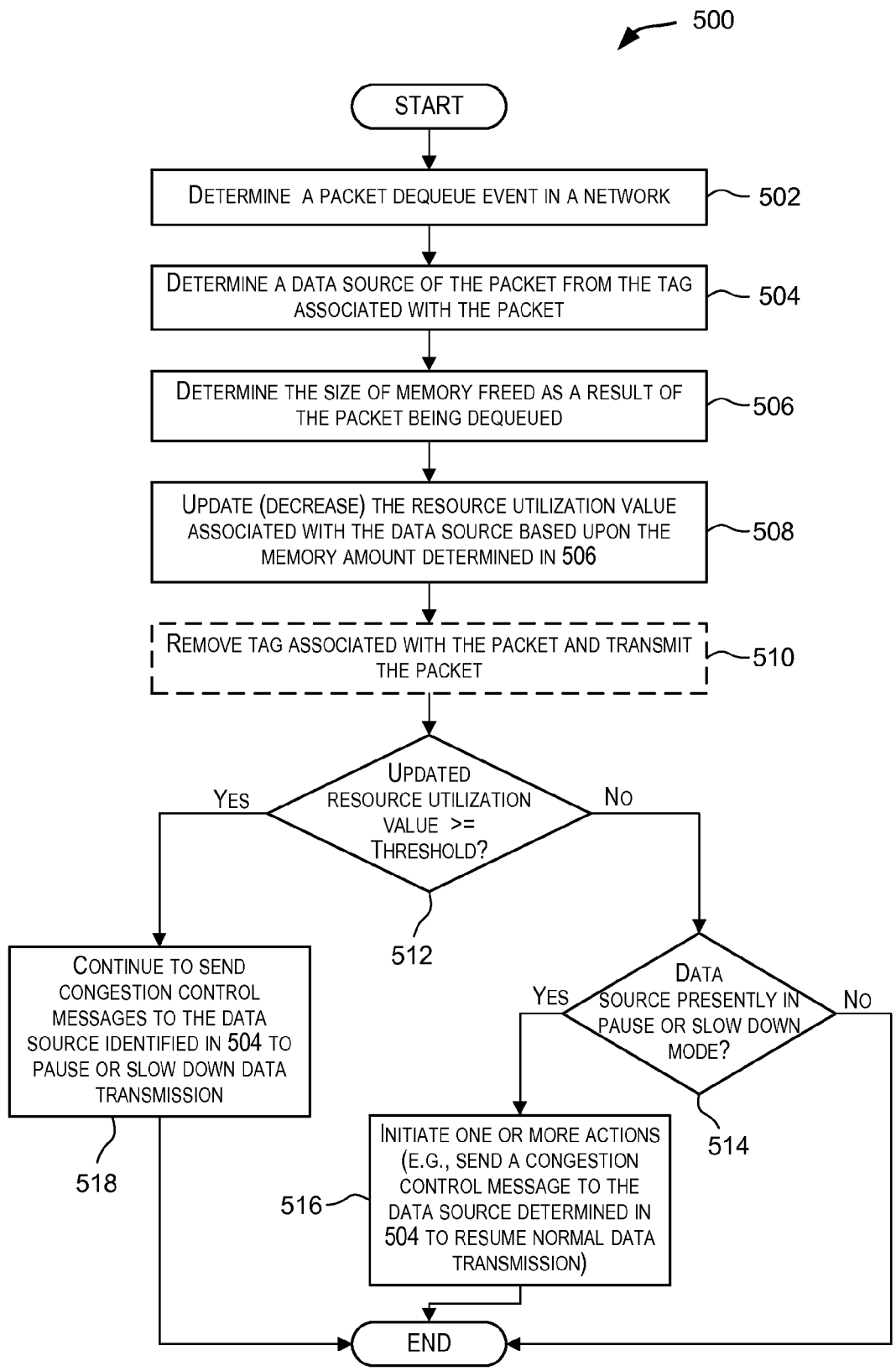
FIG. 5 is a simplified flowchart depicting a method of determining if one or more actions are to be performed upon a packet de-queue event according to an embodiment of the present invention.

FIG. 5 is a simplified flowchart 500 depicting a method of determining if one or more actions are to be performed upon a packet de-queue event according to an embodiment of the present invention. The method depicted in FIG. 5 may be implemented in software (e.g., program, code, instructions executed by a processor of a network device), or hardware, or combinations thereof. In one embodiment, the method is performed by congestion controller 116 of a network device. The embodiment depicted in FIG. 5 assumes that the memory usage is tracked by a resource utilization value associated with a data source.

As depicted in FIG. 5, processing is initiated when a packet de-queue event is detected in a network device (step 402). For example, the event may be detected when a packet is de-queued from a buffer queue in the network device and prepared for transmission or transmitted from the device.

A data source of the data packet is determined (step 504). As previously described, various different techniques may be used to determine the data source for the data packet. For example, in one embodiment, a MAC address extracted from the received data packet may identify the data source. In another embodiment, where a tag has been associated with the data packet, the information in the tag may be used to determine a data source of the packet. For example, the tag may identify an index that references a table entry stored by the network device that stores information identifying the data source for the packet.

The size of memory of the network device that is freed or will be freed as a result of de-queuing the data packet is then determined (step 506). In one embodiment, this may be determined based upon the size of the packet being de-queued.

A resource utilization value associated with the data source determined in 504 and that tracks usage of memory in the network device is then updated based upon the memory amount determined in 506 (step 508). The resource utilization value for the data source may be stored in resource utilization information stored by the network device. In 508, the resource utilization value may be decremented by the amount of memory determined in 506.

If the de-queued data packet is to be transmitted from the network device, the tag associated with the data packet is removed prior to transmission (step 510).

The updated resource utilization value is then compared to a memory-related threshold configured for the network device to see if the updated resource utilization value equals or exceeds the memory-related threshold (step 512). If the threshold is determined to be less than the threshold and further if it is determined that the data source identified in 504 is presently being paused or slowed down (step 514), a congestion control message may optionally be sent to the data source to resume normal data transmission. Alternatively, in 516, sending of congestion control messages to pause or slow down data transmission may be discontinued since the congestion condition no longer exists. If it is determined in 512 that the threshold is equaled or exceeded, thereby indicating that the congestion condition caused by the data source identified in 504 still persists, the network device may continue to send congestion control messages to the data source to pause or slow down data transmission (step 518).

As previously indicated, multiple thresholds may be configured for a particular resource being tracked in a network device. In such an embodiment, the action initiated when a first threshold is reached or exceeded may be different than the action initiated when a second threshold, different from the first threshold, is reached or exceeded.

Figure 6:
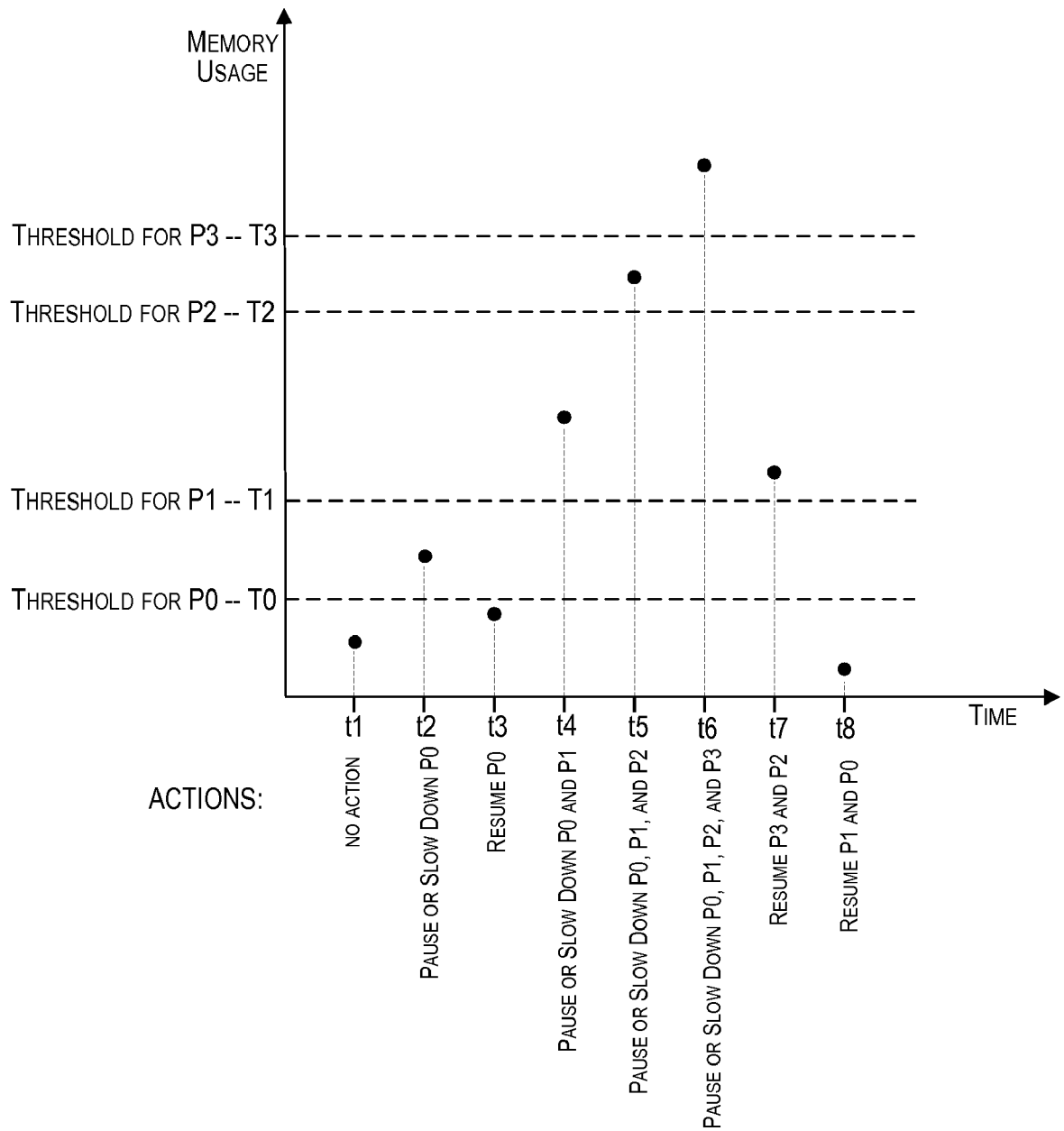
FIG. 6 depicts an example of how the amount of resource of a network device used for processing data received from a data source may change over time and the actions that may be initiated according to an embodiment of the present invention.

FIG. 6 depicts how the amount of resource of a network device used for processing data received from a data source may change over time and the actions that may be initiated according to an embodiment of the present invention. For example, the resource depicted in FIG. 6 may correspond to the memory of the network device used for processing data received from a data source. The X-axis of the graph depicts passage of time, and the Y-axis depicts the amount of the resource of the network device being used for processing data received from the data source at any particular time point. For the embodiment depicted in FIG. 6, there are four priority levels P0, P1, P2, and P3, with P0 being the lowest priority, P1 being a higher priority than P0, P2 being a higher priority than P1, and P3 being the highest priority. The priority levels may correspond to different types of data. Thresholds T0, T1, T2, and T3 are defined for the priority levels in the network device such that threshold T0 is specified for data with priority P0, threshold T1 is specified for data with priority P1, threshold T2 is specified for data with priority P2, and threshold T3 may be specified for data with priority P3. Congestion control actions that may be initiated by the network device at different time points for the data source for different types of data are specified below the X-axis corresponding to the time points.

As shown, at time t1, the memory of the network device being used for processing data received from the data source, as identified by the resource utilization value associated with the data source, is less than all the four thresholds. Accordingly, no congestion control action needs to be initiated at time t1.

At time t2, it is determined that the amount of memory of the network device being used exceeds threshold T0. As a result, the network device initiates transmission of one or more congestion control messages to the data source causing the data source to pause or slow down transmission of priority P0 data. These congestion control messages to pause or slow down data transmission of priority P0 data may be periodically sent from the network device to the data source until the amount of memory of the network device being used falls below threshold T0.

At time t3, it is determined that the amount of memory of the network device being used has fallen below threshold T0. As a result, a congestion control message to resume normal data transmission may optionally be transmitted from the network device to the data source requesting the data source to resume normal transmission of data having priority P0.

At time t4, it is determined that the amount of memory of the network device being used to process data received from the data source has exceeded both thresholds T0 and T1. As a result, the network device initiates transmission of one or more congestion control messages to the data source causing the data source to pause or slow down transmission of P0 priority data and P1 priority data. The congestion control messages to pause or slow down data transmission of P0 and P1 priority data may be periodically sent from the network device to the data source until the amount of memory of the network device being used falls below threshold T1.

At time t5, it is determined that the amount of memory of the network device being used to process data received from the data source has now exceeded threshold T2. As a result, the network device initiates transmission of one or more congestion control messages to the data source causing the data source to pause or slow down transmission of data having P0 priority data, P1 priority data, and P2 priority data. The congestion control messages to pause or slow down data transmission of P0, P1, and P2 priority data may be periodically sent from the network device to the data source until the amount of memory of the network device being used falls below threshold T2.

At time t6, it is determined that the amount of memory of the network device being used to process data received from the data source has now exceeded threshold T3. As a result, the network device initiates transmission of one or more congestion control messages to the data source causing the data source to pause or slow down transmission of P0 priority data, P1 priority data, P2 priority data, and P3 priority data. The congestion control messages to pause or slow down data transmission of P0, P1, P2, and P3 priority data may be periodically sent from the network device to the data source until the amount of memory of the network device being used falls below threshold T3.

At time t7, it is determined that the amount of memory of the network device being used has fallen below thresholds T3 and T2. As a result, one or more congestion control messages to resume normal data transmission of P2 priority data and P3 priority data may optionally be transmitted from the network device to the data source.

At time t8, it is determined that the amount of memory of the network device being used has fallen below thresholds T1 and T0. As a result, one or more congestion control messages to resume normal data transmission of P1 priority data and P0 priority data may optionally be transmitted from the network device to the data source.

In the manner described above, different actions may be performed based upon the severity of the congestion. For example, for a particular level of congestion data with priority P0 may be paused or slowed down, for a higher level of congestion priority P0 data and priority P1 data may be paused or slowed down, for an even higher level of congestion priority P0 data, priority P1 data and priority P2 data may be paused or slowed down, and so on. Accordingly, the actions that are performed may be tailored to suit particular levels of congestion in the network device. The thresholds and also the actions that are performed are user configurable.

In one embodiment, a network device is also configured to send out congestion control messages that can be interpreted and understood by different types of data sources. For example, different data sources may support different congestion control protocols, or even different versions of a congestion control protocol. A network device according to an embodiment of the present invention may be configured to determine what protocol is supported by a particular data source and send a congestion control message to that particular data source according to that protocol. In this manner, embodiments of the present invention are capable of supporting data sources using different protocols or different versions of protocols. This enhances interoperability of older data sources with newer network devices. A network device may also convert control messages from one protocol to another.

As described above, according to an embodiment of the present invention, a data source is identified as the cause of congestion in a network device based upon the amount of resources of the network device being used for processing data originating at that data source. This information is stored by the network device in the form of resource utilization information. In this manner, a data source that causes the congestion is identified based upon actual resource usage information stored by the network device for the data source and actions taken directed to that data source. Accordingly, instead of using statistical sampling or guesswork techniques to guess a source of congestion as in conventional techniques, embodiments of the present invention use actual resource utilization information corresponding to the data sources to identify one or more data sources causing congestion in the network device.

A network device according to an embodiment of the present invention is able to automatically learn the data sources from which data is received by the network device and the amount of resources of the network device utilized for processing data from the data sources. Resource utilization information 118 provides real time information for data sources and resources of the network device being used for processing data originating from the data sources. This availability of real time information enables more effective flow control messages to be generated and addressed directly and only to the data sources causing the congestion. In this manner, a more deterministic solution is provided for controlling congestion in a network device. While embodiments of the present invention are independent of the queuing method, the embodiments may accept queuing congestion alarms and generate more intelligent and deterministic flow control messages.

While embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A method performed by a network device for controlling congestion, the method comprising:
   detecting occurrence of an event impacting a resource of the network device;
   determining a data source corresponding to the event;
   updating a resource utilization value associated with the data source based upon the detected event, the resource utilization value tracking an amount of the resource of the network device being used to process data originating at the data source;

comparing the updated resource utilization value associated with data source to a first threshold;
comparing the updated resource utilization value associated with the data source to a second threshold;
sending a first message to the data source to either pause, slow down, or resume transmission of a first type of data based upon the comparison of the updated resource utilization value with the first threshold; and
sending a second message to the data source to pause, slow down, or resume transmission of a second type of data based upon the comparison of the updated resource utilization value with the second threshold, the second type of data being different from the first type of data.

2. The method of claim 1 wherein the first type of data corresponds to data associated with a first priority and the second type of data corresponds to data associated with a second priority different from the first priority.

3. The method of claim 1 wherein determining the data source comprises:
determining a data packet involved in the detected event; and
determining a data source where the data packet originated.

4. The method of claim 3 wherein determining a data source where the data packet originated comprises:
extracting information from the data packet;
determining the data source based upon the extracted information.

5. The method of claim 3 wherein determining a data source where the data packet originated comprises:
determining a tag associated with the data packet, the tag associated with the data packet by the network device upon receipt of the data packet by the network device; and
determining the data source of the data packet using the tag.

6. The method of claim 1 wherein:
detecting occurrence of the event comprises detecting receipt of a data packet by the network device;
determining a data source corresponding to the event comprises determining a data source where the data packet originated; and
updating the resource utilization value comprises:
determining an amount of memory needed for storing the data packet; and
incrementing the resource utilization value by the determined amount of memory.

7. The method of claim 6 further comprising associating a tag with the data packet, the tag comprising information usable for determining the data source for the data packet.

8. The method of claim 1 wherein:
detecting occurrence of the event comprises detecting de-buffering of a data packet by the network device;
determining a data source corresponding to the event comprises determining a data source where the data packet originated; and
updating the resource utilization value comprises:
determining an amount of memory freed by de-buffering of the data packet; and
decrementing the resource utilization value by the determined amount of freed memory.

9. The method of claim 1 wherein sending the first message comprises sending a message to the data source to pause or slow down transmission of data from the data source upon determining that the resource utilization value equals or exceeds the first threshold.

10. The method of claim 1 wherein sending the first message comprises sending a message to the data source to resume transmission of data from the data source upon determining that the resource utilization value is below the first threshold.

11. A system comprising:
a memory configured to store resource utilization value for a data source, the resource utilization value tracking an amount of a resource of the system being used to process data originating at the data source; and
a congestion controller configured to
detect occurrence of an event corresponding to the data source and impacting the resource,
update the resource utilization value associated with the data source based upon the detected event,
compare the updated resource utilization value associated with the data source to a first threshold,
compare the updated resource utilization value associated with the data source to a second threshold;
send a first message to the data source to either pause, slow down, or resume transmission of a first type of data based upon the comparison of the updated resource utilization value with the first threshold; and
send a second message to the data source to pause, slow down, or resume transmission of a second type of data based upon the comparison of the updated resource utilization value with the second threshold, the second type of data being different from the first type of data.

12. The system of claim 11 wherein the first type of data corresponds to data associated with a first priority and the second type of data corresponds to data associated with a second priority different from the first priority.

13. The system of claim 11 wherein the congestion controller is configured to:
determine a data packet involved in the detected event; and
determine a data source where the data packet originated.

14. The system of claim 13 wherein the congestion controller is configured to:
determine a tag associated with the data packet, the tag associated with the data packet upon receipt of the data packet by the system; and
determine the data source of the data packet using the tag.

15. The system of claim 11 wherein:
the event is receipt of a data packet by the system; and
the congestion controller is configured to:
determine a data source where the data packet originated; and
update the resource utilization value by
determining an amount of memory needed for storing the data packet, and
incrementing the resource utilization value by the determined amount of memory.

16. The system of claim 15 wherein the congestion controller is configured to associate a tag with the data packet, the tag comprising information usable for determining the data source for the data packet.

17. The system of claim 11 wherein:
the event is de-buffering of a data packet by the system; and
the congestion controller is configured to:
determine a data source where the data packet originated; and
update the resource utilization value by
determining an amount of memory freed by de-buffering of the data packet, and
decrementing the resource utilization value by the determined amount of freed memory.

18. The system of claim 11 wherein the congestion controller is configured to send the first message to the data source to pause or slow down transmission of data from the data source upon determining that the resource utilization value equals or exceeds the first threshold.

19. The system of claim 11 wherein the congestion controller is configured to send the first message to the data source to resume transmission of data from the data source upon determining that the resource utilization value is below the first threshold.

* * * * *

UNITED STATES PATENT AND TRADEMARK OFFICE
CERTIFICATE OF CORRECTION

PATENT NO. : 7,978,607 B1
APPLICATION NO. : 12/412290
DATED : July 12, 2011
INVENTOR(S) : Mitri Halabi et al.

It is certified that error appears in the above-identified patent and that said Letters Patent is hereby corrected as shown below:

On Title page, Item (56) In References Cited Section:

Please insert --6,515,963 B1   02/2003   Bechtolsheim et al.
6,535,484 B1   03/2003   Hughes et al.
7,046,627 B1   05/2006   Dejanovic et al.
7,197,597 B1   03/2007   Scheid et al.
7,215,641 B1   05/2007   Bechtolsheim et al.
7,359,321 B1   04/2008   Sindhu et al.
7,428,463 B2   09/2008   Jiann-Jyh Lay
2004/0049596 A1   03/2004   Schuehler et al.
2007/0081454 A1   04/2007   Bergamasco et al.
2007/0230493 A1   10/2007   Dravida et al.

Draft Standard for Local and Metropolitan Networks - Virtual Bridged Local Area Networks – Amendment 7: Congestion Management," IEEE P802.1au/D0.4, November 12, 2007, 44 pages, IEEE.

Draft Standard for Local and Metropolitan Area Networks - Virtual Bridged Local Area Networks – Amendment XX: Priority-based Flow Control," IEEE P802.1Qbb/D1.0, February 9, 2009, 36 pages, IEEE.

GAO, "Router Congestion Control," June 3, 2004, 74 pages, Xiaojie Gao, Pasadena U.S.

Signed and Sealed this
Twenty-fourth Day of July, 2012

David J. Kappos
*Director of the United States Patent and Trademark Office*

Information Technology – Telecommunications and Information Exchange Between Systems – Local and Metropolitan Area Networks – Specific Requirements - Part 3: Carrier Sense Multiple Access with Collision Detection (CSMA/CD) access method and physical layer specifications." IEEE Std 802.3-2005, 2005, 810 pages, IEEE.--